US010271337B2

(12) United States Patent
Sagong et al.

(10) Patent No.: US 10,271,337 B2
(45) Date of Patent: Apr. 23, 2019

(54) METHOD AND APPARATUS FOR PERFORMING DECODING WITH LOW COMPLEXITY IN WIRELESS COMMUNICATION SYSTEM

(71) Applicant: Samsung Electronics Co., Ltd, Gyeonggi-do (KR)

(72) Inventors: Min Sagong, Gyeonggi-do (KR); Woo-Myoung Park, Gyeonggi-do (KR); Seok-Ki Ahn, Gyeonggi-do (KR); Chi-Woo Lim, Gyeonggi-do (KR); Sung-Nam Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 15/505,243

(22) PCT Filed: Aug. 20, 2015

(86) PCT No.: PCT/KR2015/008680
§ 371 (c)(1),
(2) Date: Feb. 20, 2017

(87) PCT Pub. No.: WO2016/028094
PCT Pub. Date: Feb. 25, 2016

(65) Prior Publication Data
US 2017/0265200 A1    Sep. 14, 2017

(30) Foreign Application Priority Data

Aug. 20, 2014  (KR) .................. 10-2014-0108416

(51) Int. Cl.
*H04W 72/08* (2009.01)
*H04B 17/345* (2015.01)
(Continued)

(52) U.S. Cl.
CPC .......... *H04W 72/082* (2013.01); *H04B 17/26* (2015.01); *H04B 17/345* (2015.01);
(Continued)

(58) Field of Classification Search
CPC ............ H04W 72/082; H04W 72/0413; H04L 1/1887; H04L 5/0057; H04L 27/0008;
(Continued)

(56) References Cited

U.S. PATENT DOCUMENTS 7,697,654 B1 *  4/2010  Jin ...................... H04L 27/2647
                                                        375/298
2004/0198296 A1 * 10/2004  Hui ...................... H04L 25/023
                                                        455/296
(Continued)

FOREIGN PATENT DOCUMENTS

KR     1020140081751    7/2014
KR     1020140081753    7/2014
WO     2014098536 A1    6/2014

OTHER PUBLICATIONS

International Search Report dated Dec. 8, 2015 in connection with International Application No. PCT/KR2015/008680, 5 pages.
(Continued)

*Primary Examiner* — Kwang B Yao
*Assistant Examiner* — Moo Jeong

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present invention relates to method and apparatus for performing a decoding with low complexity in a wireless communication system. A decoding method of a terminal in a wireless communication system comprises determining a first characteristic value indicating a statistical characteristic
(Continued)

of an interference signal based on a received signal of a base station, determining a second characteristic value indicating a statistical characteristic of an interference signal based on data received from the base station, and decoding the data according to a decoding scheme corresponding to a difference of the first characteristic value and the second characteristic value.

20 Claims, 18 Drawing Sheets

(51) Int. Cl.

| | | |
|---|---|---|
| *H04L 27/00* | (2006.01) | |
| *H04L 27/36* | (2006.01) | |
| *H04L 27/10* | (2006.01) | |
| *H04W 72/04* | (2009.01) | |
| *H04B 17/26* | (2015.01) | |
| *H04L 5/00* | (2006.01) | |
| *H04L 1/18* | (2006.01) | |
| *H04L 1/00* | (2006.01) | |

(52) U.S. Cl.
CPC .............. *H04L 1/00* (2013.01); *H04L 1/1887* (2013.01); *H04L 5/0057* (2013.01); *H04L 27/0008* (2013.01); *H04L 27/10* (2013.01); *H04L 27/364* (2013.01); *H04W 72/0413* (2013.01); *H04L 5/0023* (2013.01); *H04L 5/0035* (2013.01)

(58) Field of Classification Search
CPC ......... H04L 27/364; H04L 27/10; H04L 1/00; H04L 5/0035; H04L 5/0023; H04B 17/345; H04B 17/26
See application file for complete search history.

(56) References Cited

U.S. PATENT DOCUMENTS

| | | | |
|---|---|---|---|
| 2005/0282500 A1* | 12/2005 | Wang | H04L 1/20 455/67.13 |
| 2008/0075027 A1* | 3/2008 | Lee | H04W 52/28 370/311 |
| 2008/0273479 A1* | 11/2008 | Kwak | H04W 72/14 370/311 |
| 2009/0046800 A1 | 2/2009 | Xu et al. | |
| 2009/0197590 A1* | 8/2009 | Borran | H04W 52/242 455/423 |
| 2009/0199063 A1* | 8/2009 | Chun | H04L 1/1607 714/749 |
| 2009/0238086 A1 | 9/2009 | Ringstrom et al. | |
| 2010/0014478 A1* | 1/2010 | Futagi | H04L 1/1819 370/329 |
| 2012/0099446 A1 | 4/2012 | Su et al. | |
| 2014/0177756 A1 | 6/2014 | Park et al. | |
| 2015/0358194 A1 | 12/2015 | Yu et al. | |

OTHER PUBLICATIONS

Written Opinion of the International Searching Authority dated Dec. 8, 2015 in connection with International Application No. PCT/KR2015/008680, 4 pages.

Sungnam Hong, et al., "A Modulation Technique for Active Interference Design Under Downlink Cellular OFDMA Networks", IEEE, 2014, 6 pages.

Changkyu Seol, et al., "A Statistical Inter-Cell Interference Model for Downlink Cellular OFDMA Networks Under Log-Normal Shadowing and Multipath Rayleigh Fading", IEEE Transactions on Communications, vol. 1, No. X, XXX, 2009, 10 pages.

* cited by examiner

|  | Cell 0 | Cell 1 | Cell 2 | Cell 3 |
|---|---|---|---|---|
| Fixed allocation (1100) | User0: FQAM | User0: FQAM | User0: FQAM | User0: FQAM |
|  |  |  |  | User1: FQAM |
| Dynamic allocation (1110) | User1: FQAM | User1: FQAM | User1: FQAM | User2: QAM |
|  | User2: FQAM | User2: QAM |  |  |
|  | User3: QAM | User3: QAM | User2: QAM | User3: QAM |
|  | User4: QAM |  |  |  |

FIG.11A

| Cell 0 | Cell 1 | Cell 2 | Cell 3 |
|---|---|---|---|
| User1: FQAM | User0: FQAM | User0: FQAM | User0: FQAM |
| User0: FQAM | User1: FQAM | User1: FQAM | User1: FQAM |
| User2: FQAM | User2: QAM | | User2: QAM |
| User3: QAM | User3: QAM | User2: QAM | User3: QAM |
| User4: QAM | | | |

FIG.11B

| Cell 0 | Cell 1 | Cell 2 | Cell 3 |
|---|---|---|---|
| User0: FQAM | User0: FQAM | User0: FQAM | User0: FQAM |
| | | | User1: FQAM |
| User1: FQAM | User1: FQAM | User1: FQAM | |
| User2: FQAM | User2: QAM | | User2: QAM |
| User3: QAM | | User2: QAM | |
| | User3: QAM | | User3: QAM |
| User4: QAM | | | |

FIG.12

| Cell 0 | Cell 1 | Cell 2 | Cell 3 |
|---|---|---|---|
| User0: FQAM | User0: FQAM | User0: FQAM | User0: FQAM |
| User1: FQAM (1300) | User1: QAM (1301) | User1: QAM (1302) | User1: QAM (1303) |
| User2: FQAM | | | User2: QAM (1304) |
| User3: QAM | User2: QAM | User2: QAM | User3: QAM |
| User4: QAM | | | |

FIG.13A

| Cell 0 | Cell 1 | Cell 2 | Cell 3 |
|---|---|---|---|
| User0: FQAM | User0: FQAM | User0: FQAM | User0: FQAM |
| User1: FQAM (1310) | User1: FQAM (1311) | User1: FQAM (1312) | User1: FQAM (1314) |
| User2: FQAM | | User2: FQAM (1313) | User2: QAM (1315) |
| User3: QAM | User2: QAM | User3: QAM | User3: QAM |
| User4: QAM | | | |

FIG.13B

| $\alpha_{CQI}$ | $\alpha_{DATA}$ | $M_\alpha$ | $\alpha_{CQI}$ | $\alpha_{DATA}$ | $M_\alpha$ |
|---|---|---|---|---|---|
| 0.8 | 0.9 | -0.42 | 0.6 | 0.9 | -1.85 |
| 0.6 | 0.7 | -0.84 | 1.1 | 0.7 | 1.52 |
| 0.4 | 0.5 | -1.68 | 2.0 | 0.4 | 5.71 |

FIG.15

METHOD AND APPARATUS FOR PERFORMING DECODING WITH LOW COMPLEXITY IN WIRELESS COMMUNICATION SYSTEM

CROSS-REFERENCE TO RELATED APPLICATION(S)

The present application claims priority under 35 U.S.C. § 365 to International Patent Application No. PCT/KR2015/008680 filed Aug. 20, 2015, entitled "METHOD AND APPARATUS FOR PERFORMING DECODING WITH LOW COMPLEXITY IN WIRELESS COMMUNICATION SYSTEM", and, through International Patent Application No. PCT/KR2015/008680, to Korean Patent Application No. 10-2014-0108416 filed Aug. 20, 2014, each of which are incorporated herein by reference into the present disclosure as if fully set forth herein.

TECHNICAL FIELD

The present invention relates to a method and an apparatus for determining a decoding operation in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, a wireless communication system assumes a Gaussian distribution with respect to an interference signal to conduct decoding with low complexity. That is, to make characteristics of the interference signal as close to the Gaussian distribution as possible, the QAM modulation scheme is mostly used. However, since it is known that a channel capacity of a non-Gaussian channel is greater than a Gaussian channel, when the decoding is conducted properly, a higher decoding performance can be obtained in the non-Gaussian channel than the Gaussian channel. Thus, it was required to develop a modulation scheme allowing the characteristics of the interference signal to exhibit the non-Gaussian distribution, and as a result, a suggested modulation scheme is the FQAM. The FQAM is a hybrid modulation scheme combining the QAM and the FSK, and can include all of advantages of high spectrum efficiency of the QAM and a non-Gaussian interference signal of the FSK.

When the FQAM is used in an interference cell, statistical characteristic of the interference signal becomes non-Gaussian and accordingly a non-Gaussian decoding method needs to be used to enhance the performance through the FQAM. The non-Gaussian decoding method is a decoding method using a statistical characteristic value (hereafter, referred to as an 'alpha value) of the interference signal. To systematically operate the non-Gaussian decoding method, it is required to calculate the alpha value in the process of Channel Quality Indicator (CQI) calculation and to calculate the alpha value in the process of data decoding as well. To minimize a performance loss, there should be no difference between the alpha value of the CQI calculation and the alpha value of the data decoding. However, in the system operation, a difference value inevitably occurred between the alpha value of the CQI calculation and the alpha value of the data decoding.

DISCLOSURE OF INVENTION

Technical Problem

Accordingly, an embodiment of the present invention to provide a method and an apparatus for determining a decoding operation of a terminal based on an alpha value in the terminal.

Another embodiment of the present invention to provide a method and an apparatus for calculating a mismatch metric of an alpha value for Channel Quality Indicator (CQI) calculation and an alpha value for data decoding in a terminal.

Yet another embodiment of the present invention to provide a method and an apparatus for controlling a decoding operation based on a mismatch metric of an alpha value for CQI calculation and an alpha value for data decoding in a terminal.

Still embodiment of the present invention to provide a method and an apparatus for controlling Hybrid Automatic Repeat reQuest (HARQ) based on a mismatch metric received from a terminal in a base station.

A further embodiment of the present invention to provide a method and an apparatus for performing resource allocation control scheduling of a terminal based on a mismatch metric received from a terminal in a base station.

Solution to Problem

According to an embodiment of the present invention, a method for operating a terminal in a wireless communication system comprises determining a first characteristic value indicating a statistical characteristic of an interference signal based on a received signal of a base station, determining a second characteristic value indicating a statistical characteristic of an interference signal based on data received from the base station, and decoding the data according to a decoding scheme corresponding to a difference of the first characteristic value and the second characteristic value.

According to an embodiment of the present invention, a method for operating a base station in a wireless communication system comprises receiving information regarding a data decoding result and a difference of a first characteristic value and a second characteristic value from a terminal, and performing scheduling for the terminal based on the decoding result and the information about the difference of the first characteristic value and the second characteristic value. The first characteristic value indicates a statistical characteristic for an interference determined based on a signal transmitted to the terminal, and the second statistical characteristic value indicates a statistical characteristic for an interference determined based on the data.

According to an embodiment of the present disclosure, an apparatus of a terminal in a wireless communication system comprises at least one transceiver and at least one processor, operatively coupled to the at least one transceiver. The at least one processor is further configured to determine a first characteristic value indicating a statistical characteristic of an interference signal based on a received signal from a base station, determine a second characteristic value indicating a statistical characteristic of an interference signal based on data received from the base station, and decode the data according to a decoding scheme corresponding to a difference of the first characteristic value and the second characteristic value.

According to an embodiment of the present disclosure, an apparatus of a base station in a wireless communication system comprises at least one transceiver configured to receive, from a terminal, information regarding a data decoding result and a difference of a first characteristic value and a second characteristic value, and at least one processor configured to perform scheduling for the terminal based on the decoding result and the information regarding the difference of the first characteristic value and the second characteristic value. The first characteristic value indicates a statistical characteristic for an interference determined based on a signal transmitted to the terminal, and the second statistical characteristic value indicates a statistical characteristic for an interference determined based on the data.

Advantageous Effects of Invention

A terminal according to an embodiment of the present invention can calculate a mismatch metric of an alpha value for Channel Quality Indicator (CQI) calculation and an alpha value for data decoding, control a decoding operation based on the calculated mismatch metric, and thus enhance a decoding performance of the terminal and perform reliable communication.

A base station according to an embodiment of the present invention can control Hybrid Automatic Repeat reQuest (HARQ) based on the mismatch metric received from the terminal, perform scheduling of the terminal, and thus enhance the decoding performance of the terminal and execute the reliable communication.

BRIEF DESCRIPTION OF DRAWINGS

FIGS. 11A and 11B are diagrams depicting a resource allocation status based on a mismatch metric of a terminal in a base station according to an embodiment of the present invention.

FIG. 12 is a diagram depicting a resource allocation status of a terminal in a base station according to an embodiment of the present invention.

FIGS. 13A and 13B are diagrams depicting resource allocation status change of neighboring base stations according to change of a mismatch metric value of a first terminal according to an embodiment of the present invention.

FIG. 15 is a diagram showing a table indicating a mismatch metric of an alpha value for Channel Quality Indicator (CQI) and an alpha value for data decoding according to an embodiment of the present invention.

BEST MODE FOR CARRYING OUT THE INVENTION

Hereinafter, a preferred embodiment of the present invention is described in detail with reference to the accompanying drawings. In the following explanations of the present invention, specific descriptions on well-known functions or constitutions will not be described in detail if they would unnecessarily obscure the subject matter of the present invention. Also, terminologies to be described below are defined in consideration of functions in the present invention and can vary depending on a user's or an operator's intention or practice. Thus, their definitions should be defined based on all the contents of the specification.

Hereafter, an embodiment of the present invention can enhance a decoding performance by a terminal's determining a first alpha value for Channel Quality Indicator (CQI) calculation based on a pilot signal received from a base station, determining a second alpha value for data decoding based on data received from the base station, determining a mismatch metric according to a difference value of the determined first alpha value and second alpha value, and determining a decoding operation of the terminal based on the determined mismatch metric. Also, since the base station receives a decoding result of the terminal and the determined metric from the terminal and conducts scheduling for the terminal, an embodiment of the present invention can enhance a decoding performance of the terminal and carry out reliable communication.

Figure 1:
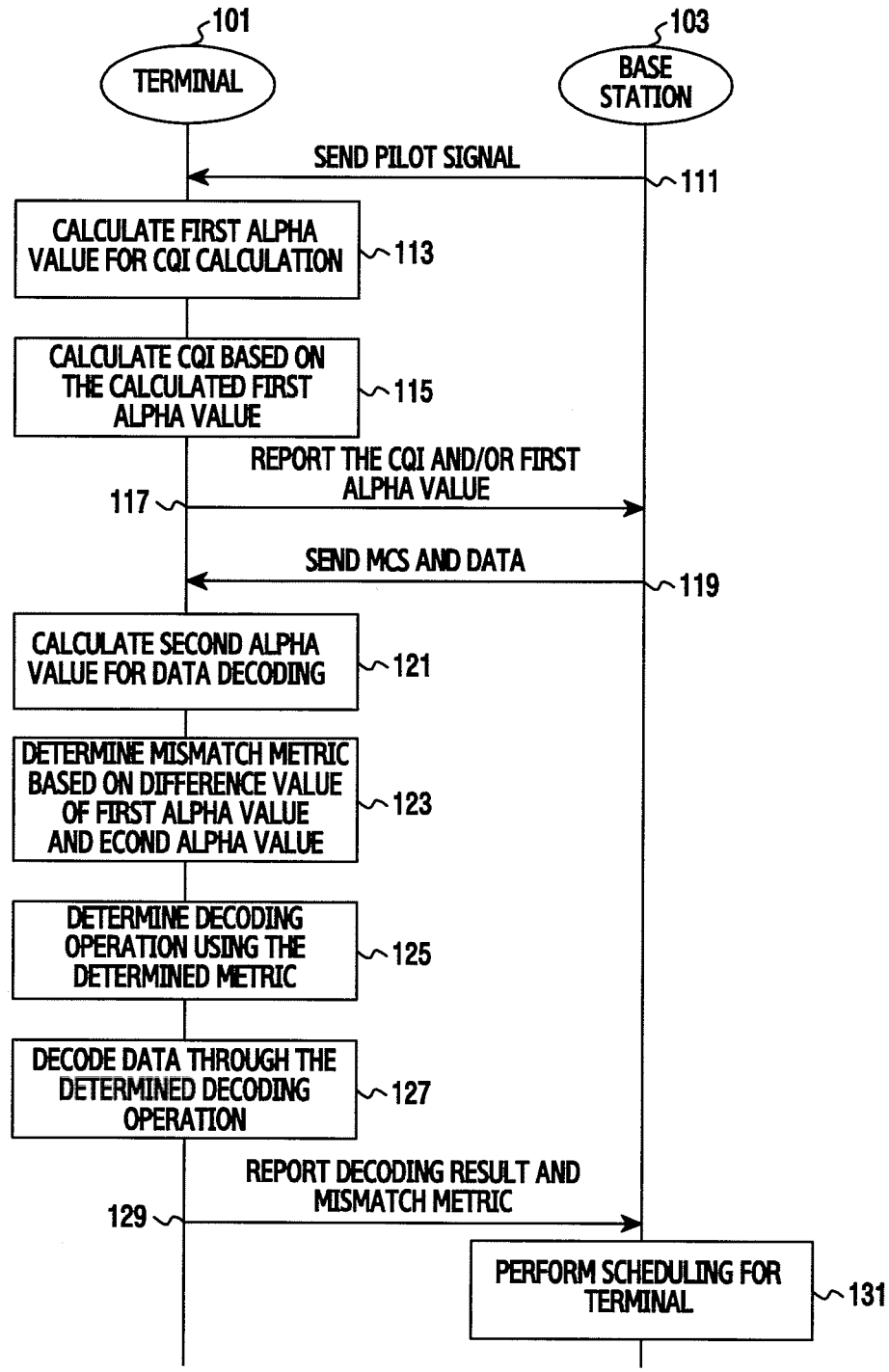
FIG. 1 is a flowchart illustrating a decoding operation of a terminal and a scheduling procedure of a base station based on a mismatch metric of alpha values in a wireless communication system according to an embodiment of the present invention.

FIG. 1 is a flowchart illustrating a decoding operation of a terminal and a scheduling procedure of a base station based on a mismatch metric of alpha values in a wireless communication system according to an embodiment of the present invention.

Referring to FIG. 1, a wireless communication network according to an embodiment of the present invention can include a terminal 101 and a base station 103.

The base station 103 can send a pilot signal to the terminal 101 in step 111. For example, the base station 103 can send the pilot signal for channel estimation of the terminal. At this time, the signal for the channel estimation of the terminal is not limited to the pilot signal and can be other signal enabling the channel estimation of the terminal. For example, the other signal enabling the channel estimation of the terminal can be a reference signal, a sync signal, a preamble signal, and the like.

The terminal 101 receives the pilot signal from the base station 103, and calculates a first alpha value for CQI calculation based on a pilot signal reception result in step 113. At this time, the alpha value (e.g., the first alpha value) indicates a statistic characteristic value of Inter Cell Interference (ICI). For example, the alpha value is a parameter representing a non-Gaussian characteristic, and can be calculated based on a Complex Generalized Gaussian (CGG) model of Equation 1 using Equation 2. Here, the non-Gaussian characteristic can indicate whether interference or noise of a channel follows a non-Gaussian distribution, or indicate a non-Gaussian level of the interference or the noise of the channel.

$$f_{CG}(x) = \frac{\alpha}{2\pi\beta^2\Gamma(2/\alpha)} \exp\left(-\left(\frac{|x|}{\beta}\right)^\alpha\right) \quad \text{Equation 1}$$

Here, $f_{CG}$ indicates a probability density function (pdf) of the channel interference or noise, x denotes a variable indicating the channel interference or noise, and α denotes a shape parameter indicating how much the CGG distribution is away from a complex Gaussian distribution. Also, $\Gamma(x)$ is a Gamma function, and $\Gamma(x) \triangleq \int_0^\infty t^{z-1} \exp(-t)dt$ is defined. Also, β denotes a scale parameter.

$$\hat{\alpha} = \frac{\ln(3^6/2^{10})}{\ln\left(\frac{\left(\frac{1}{N_s}\sum|Z[K]|\right)^2}{\frac{1}{N_s}\sum|Z[K]|^2} - \pi/4 + 3^2/2^{3.5}\right) + \ln(3/2\sqrt{2})} \quad \text{Equation 2}$$

Here, $\hat{\alpha}$ denotes the first alpha value, $N_s$ denotes the number of Quadrature Amplitude Modulation (QAM) symbols in a code frame, and $Z[k]$ denotes a signal after a channel-compensated signal is removed from a received signal. Accordingly, $Z[k]$ for the first alpha value calculation indicates a signal produced by removing a channel-compensated pilot signal from a received pilot signal.

Figure 14:
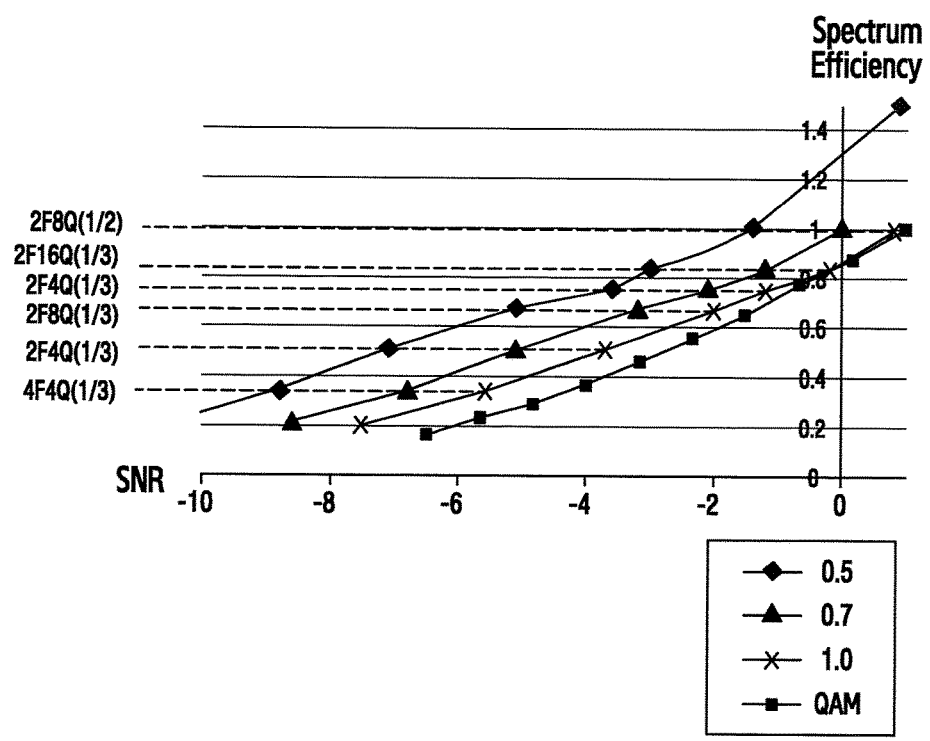
FIG. 14 is a curve graph showing a Signal to Noise Ratio (SNR), a modulation scheme, and a coding rate corresponding to a first alpha value according to an embodiment of the present invention.

Next, the terminal 101 can calculate the CQI based on the calculated first alpha value in step 115. According to an embodiment, the terminal 101 can determine the CQI based on a pre-stored table or curve graph indicating the CQI based on a Signal to Noise Ratio (SNR) and an alpha value. For example, the terminal 101 can determine as the CQI, a modulation scheme and a coding rate corresponding to the SNR and the first alpha value for a pilot signal using a pre-obtained curve graph as shown in FIG. 14. For example, when the SNR is 8.8 dB and the first alpha value is 0.5, the terminal 101 can determine a modulation level as 16FQAM including 4FSK and 4QAM and determine the coding rate as 1/3. Here, the curve graph showing the CQI based on the SNR and the alpha value can be obtained or stored in advance through experiments. According to another embodiment, the terminal 101 may calculate the CQI based on the first alpha value using a conventional known method. According to yet another embodiment, the terminal 101 can determine a Modulation and Coding Scheme (MCS) based on a spectrum efficiency corresponding to the SNR and the first alpha value. Herein, the spectrum efficiency can indicate the number of bits transmittable within a unit resource. Additionally, when calculating the CQI, the terminal 101 can determine a decoding parameter.

Next, the terminal 101 reports the calculated CQI and/or the first alpha value to the base station 103 in step 117. For example, the terminal 101 may report both of the CQI and the first alpha value or either the CQI or the first alpha value to the base station 103 in step 117. The CQI can include at least one of the modulation level, the coding rate, and the SNR. After receiving the CQI and/or the first alpha value from the terminal 101, the base station 103 can transmit the MCS and data to the terminal 101 in step 119. Here, the base station 103 can determine the MCS based on the CQI and/or the first alpha value received from the terminal 101. For example, when receiving the SNR and the first alpha value from the terminal 101, the base station 103 can determine the modulation level coding rate corresponding to the received SNR and first alpha value by referring to the curve graph as shown in FIG. 14.

After receiving the MCS and the data from the base station 103, the terminal 101 can calculate a second alpha value for decoding the received data in step 121. For example, the terminal 101 can calculate the second alpha value indicating a non-Gaussian level of interference or noise of a current channel based on a data reception result. Here, the second alpha value can be calculated in the same manner as the first alpha value calculation based on Equations 1 and 2. The calculation method of the second alpha value is different from the first alpha value calculation method in that $Z[k]$ of Equation 2 denotes a resulting signal by removing the channel compensated data signal from the received data signal. Here, the channel compensated data signal can indicate a hard decision result of the received signal.

Next, the terminal 101 can determine a mismatch metric based on a difference of the first alpha value calculated for the CQI calculation and the second alpha value calculated for the data decoding in step 123. According to an embodiment of the present invention, the mismatch metric of the first alpha value and the second alpha value can be calculated using Equation 3.

$$M = S \sum_{k=B^*\alpha_{min}}^{B^*\alpha_{max}} \Delta_k, \, S = \text{sgn}(\alpha_{CQI} - \alpha_{DATA}) \quad \text{Equation 3}$$

Here, M denotes the mismatch metric of the first alpha value and the second alpha value, $\alpha_{CQI}$ denotes the first alpha value calculated for the CQI calculation, and $\alpha_{DATA}$ denotes the second alpha value calculated for the data decoding. Also, sgn denotes a sign function. Also, $\alpha_{max}$ indicates the greater value of $\alpha_{CQI}$ and $\alpha_{DATA}$, and $\alpha_{min}$ indicates the smaller value of $\alpha_{CQI}$ and $\alpha_{DATA}$. Also, B indicates a quantization level. Also, when an interval (e.g., 0 through 2) usable as the $\alpha$ value is divided into m-ary intervals, $\Delta_k$ indicates an SNR difference of $\alpha$ values of a k-th interval and can be calculated as $C/A^k$. Here, C denotes a scale parameter, and A denotes an increase range. In so doing, $A^k$ indicates that, as the $\alpha$ value decreases, a performance gap between the $\alpha$ values increases.

Figure 6:
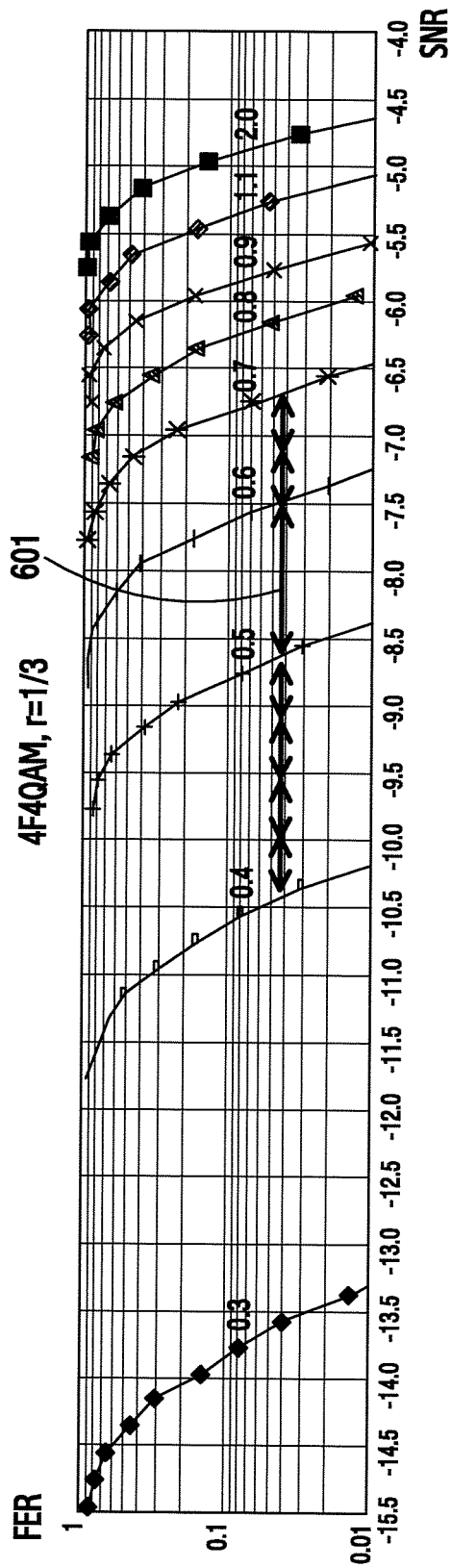
FIG. 6 is a graph showing a decoding performance difference determined by an alpha value in a terminal according to an embodiment of the present invention.

For example, referring to FIG. 6, the $\alpha$ value can be divided to 0.3, 0.4, 0.5, 0.6, 0.7, 0.8, 0.9, 1.1, and 2.0. At this time, $\Delta_3$ can indicate an SNR difference 601 when $\alpha$ is 0.5 and when $\alpha$ is 0.6. FIG. 6 shows that the performance gap increases by sqrt(2) times as the $\alpha$ value decreases by 0.1.

According to an embodiment, $\Delta_k$ can be pre-calculated and arranged in a table. According to another embodiment, by pre-calculating and arranging the mismatch metric M in the table based on $\alpha_{CQI}$ and $\alpha_{DATA}$, the actual operation may omit the calculation process of Equation 3 and retrieve the mismatch metric based on the first alpha value and the second alpha value from the pre-stored table. For example, assuming that the performance gap by the difference of the a value increases by sqrt(2) times as $\alpha$ decreases by 0.1, the mismatch metric based on $\alpha_{CQI}$ and $\alpha_{DATA}$ can be calculated by setting A=$\sqrt{2}$, B=10, and C=9.5, and a table 1501 showing the mismatch metric $M_\alpha$ corresponding to $\alpha_{CQI}$ and $\alpha_{DATA}$ can be stored as shown in FIG. 15. The values of $\alpha_{CQI}$, $\alpha_{DATA}$, and $M_\alpha$ in the table 1501 of FIG. 15 are exemplary values, and it is evident that they can vary according to A, B, and C values.

Next, the terminal 151 can determine a decoding operation using the mismatch metric in step 125. In detail, the terminal 101 can compare the mismatch metric calculated based on the difference value between the first alpha value and the second alpha value with a preset at least one threshold, and then determine the decoding operation according to a comparison result. For example, according to the comparison result of the mismatch metric and the threshold, the terminal 101 may not attempt the decoding of corresponding data, can adjust at least one decoding parameter (e.g., the number of decoding iterations, the number of global iterations of Bit Interleaved Coded Modulation (BICM), an nm value in sub-optional non-binary decoding), or can determine whether to decode with the decoding parameter assumed in the CQI calculation. The method for determining the decoding operation according to the comparison result shall be elucidated.

Next, the terminal 101 can decode the data received in step 119 based on the determined decoding operation in step 127, and report information about a data decoding result and the mismatch metric to the base station 103 in step 129. For example, the decoding result can include ACKnowledge (ACK)/Non-ACK (NACK) indicating whether or not the received data is successfully decoded. According to an embodiment, when the mismatch metric value is below a certain level, the terminal 101 can send a scheduling request message for resource allocation to the base station 103.

Next, the base station 103 can perform scheduling for the terminal 101 based on at least one of the decoding result and the mismatch metric received from the terminal 101 in step 131. For example, the base station 103 can compare the mismatch metric received from the terminal 101 with at least one threshold, and determine a Hybrid Automatic Repeat reQuest (HARQ) related control operation for the data based on the comparison result. For example, the base station 103 can determine which one of chase combining, retransmission, and Incremental Redundancy (IR) is conducted on corresponding data. Here, the HARQ related control method of the base station 103 shall be elucidated.

For example, the base station 103 can perform the scheduling to allocate a more reliable resource to the corresponding terminal 101 based on the mismatch metric received from the terminal 101. According to various embodiments of the present invention, the base station 103 can change the resource to be allocated to the terminal 101 based on the mismatch metric received from the terminal 101. For example, each base station 103 for each cell can divide and operate the whole resource region in a resource region 1100 fixedly allocated for FQAM and a resource region 1110 dynamically allocable for FQAM and QAM as shown in FIG. 11A. In so doing, the base station 103 can determine whether to allocate the terminal 101 the fixed resource region 1100 for the FQAM or the dynamically allocable resource region 1110 based on the mismatch metric received from the terminal 101.

For example, as shown in FIG. 11A, when a mismatch metric for a terminal 0 (User 0) of a cell 0 using the fixed resource region 1100 is greater than a preset threshold and a mismatch metric for a terminal 1 (User 1) of the cell 0 using the dynamically allocable resource region 1110 is smaller than a preset threshold, the base station 103 can schedule to allocate the fixed resource region 1100 to the terminal 1 and the dynamically allocable resource region 1110 to the terminal 0 as shown in FIG. 11B.

According to another embodiment of the present invention, the base station 103 can expand the fixed resource region 1100 for the FQAM based on the mismatch metric received from the terminal 101, and allocate the expanded resource region to the terminal 101. For example, the base station 103 can perform a function for expanding the fixed resource region 1100 for the FQAM of the base station 103 based on the number of terminals having the mismatch metric value below a certain level, or expanding a fixed resource for the FQAM of a neighboring base station. For example, the base station 103 can perform a function for expanding the fixed resource region 1100 for the FQAM of the base station 103 based on the number of terminals which send the scheduling request message for the resource allocation, or expanding a fixed resource for the FQAM of a neighboring base station. Here, the scheduling method for the resource allocation of the base station 103 shall be elucidated.

Figure 2:
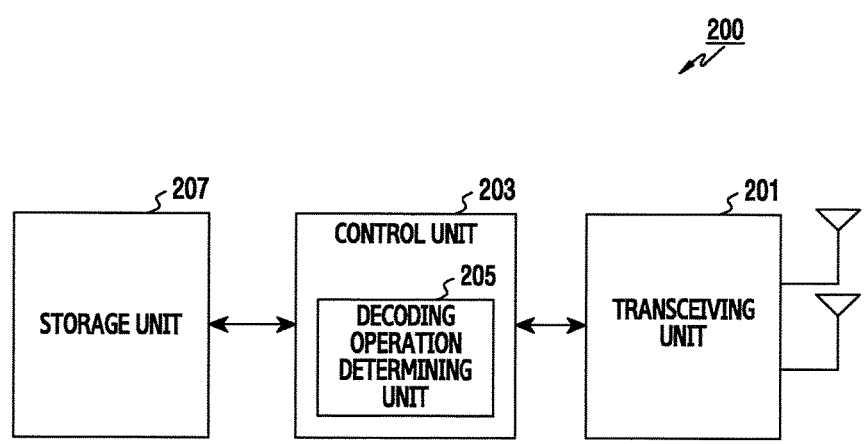
FIG. 2 is a block diagram of a terminal according to an embodiment of the present invention.

FIG. 2 is a block diagram of a terminal according to an embodiment of the present invention.

Referring to FIG. 2, the terminal 200 can include a transceiving unit 201, a control unit 203, and a storage unit 207.

The transceiving unit 201 can transceive signals with a base station under control of the control unit 203. For example, the transceiving unit 201 can receive a pilot signal from the base station. For example, the transceiving unit 201 can receive MCS information and data from the base station. For example, the transceiving unit 201 can send a CQI and/or a first alpha value to the base station under the control of the control unit 203. For example, the transceiving unit 201 can send a data decoding result and a mismatch metric of a first alpha value and a second alpha value to the base station under the control of the control unit 203. Here, the first alpha value can indicate an alpha value calculated for CQI calculation, and the second alpha value can indicate an alpha value calculated for data decoding.

While the transceiving unit 201 is configured as the single module in the embodiment of the present invention, a transmitting unit and a receiving unit may be separately configured according to a design method. Also, although not depicted in the drawing, the transceiving unit 201 can be configured by including a transmitting unit including a plurality of encoders, a plurality of modulators, a plurality of subcarrier mappers, a plurality of modulators, and a plurality of Radio Frequency (RF) transmitters, and by including a receiving unit including a plurality of decoders, a plurality of demodulators, a plurality of subcarrier demappers, a plurality of demodulators, and a plurality of RF receivers. The transceiving unit 201 according to an embodiment of the present invention can include a plurality of modulators and perform the FQAM modulation. The transceiving unit 201 according to an embodiment of the present invention can include a plurality of demodulators, and thus decode data under control of a decoding operation determining unit 205 or omit the decoding. Also, the transceiving unit 201 according to an embodiment of the present invention can perform the decoding operation based on at least one decoding parameter adjusted by the decoding operation determining unit 205.

The control unit 203 controls and processes general operations of the terminal 200. The control unit 203 controls and processes to estimate a channel between the terminal 200 and the base station, to report information of the estimated channel to the base station, to receive MCS information and data from the base station, to decode data, and to send a decoding result to the base station. In particular, according to an embodiment of the present invention, the control unit 203 controls and processes functions for calculating a mismatch metric based on a difference of a first alpha value for CQI calculation and a second alpha value for data decoding, and determining a decoding operation based on the calculated mismatch metric. Also, in the CQI calculation, the control unit 203 controls and processes functions for determining at least one decoding parameter for the decoding operation, and then decoding the data received from the base station based on at least one decoding parameter.

For example, the control unit 203 controls and processes functions for calculating a first alpha value for CQI calculation based on a pilot signal reception result from the base station, and calculating a second alpha value for data decoding based on MCS and data reception result from the base station. Herein, the first alpha value and the second alpha value can be, as explained in FIG. 1, calculated based on Equations 1 and 2. The decoding operation determining unit 205 calculates the mismatch metric based on the difference of the first alpha value and the second alpha value. Herein, as explained in FIG. 1, the mismatch metric can be calculated using Equation 3, or retrieved using the table 1501 of FIG. 15.

The decoding operation determining unit 205 can calculate the mismatch metric for the alpha values and then determine the decoding operation by comparing the calculated mismatch metric with at least one threshold. For example, while the decoding operation determining unit 205 determines at least one decoding parameter for the decoding operation in the CQI calculation, since the decoding performance using the decoding parameter determined in the CQI calculation may not be efficient because channel states of the CQI calculation time and the data reception time are different, it controls and processes an operation for controlling the decoding parameter based on the mismatch metric for the alpha values for the sake of the efficient decoding operation reflecting the changed channel state.

Figure 7:
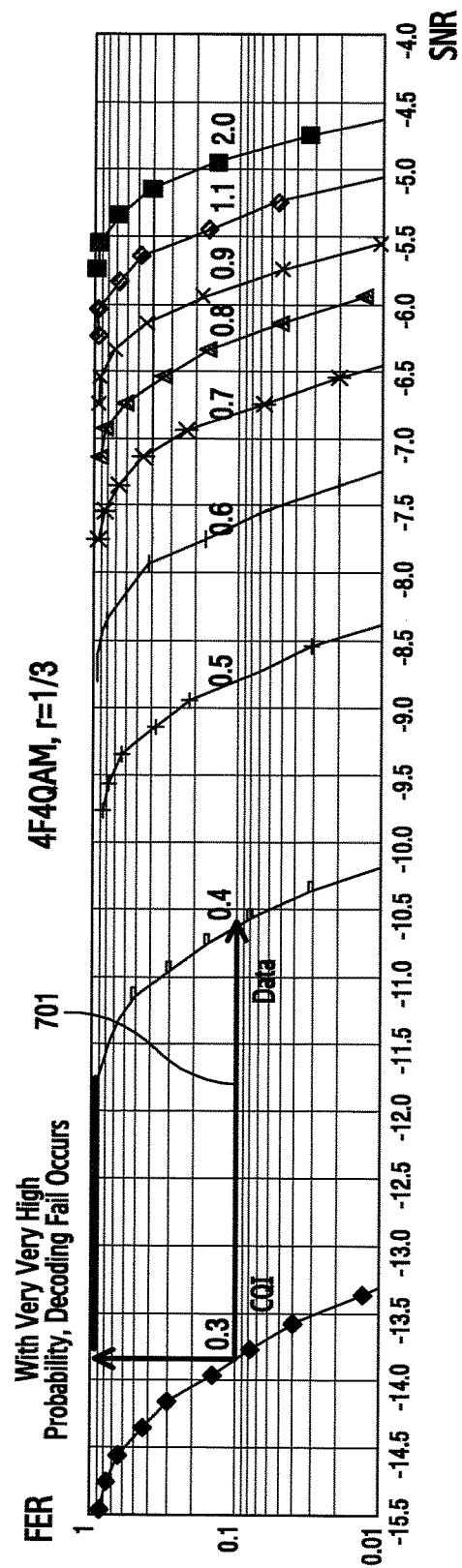
FIG. 7 is a graph for determining a decoding method of a terminal according to an alpha value in a terminal according to an embodiment of the present invention.

To determine the decoding operation according to a size of the mismatch metric for the alpha values, the decoding operation determining unit 205 can use three thresholds, that is, $THR_{FAIL}$, $THR_{NORMAL}$, and $THR_{GOOD}$. Here, $THR_{FAIL}$, $THR_{NORMA}$, and $THR_{GOOD}$ can satisfy relations of $THR_{FAIL} < THR_{NORMA} < THR_{FAIL}$. Alternatively, $THR_{FAIL}$ can satisfy $THR_{FAIL} < 0$. According to an embodiment, $THR_{NORMA}$ can be 0. When the mismatch metric value is smaller than $THR_{FAIL}$ ($M < THR_{FAIL} < 0$), the decoding operation determining unit 205 can determine that the non-Gaussian level is greatly degraded and the data decoding success is difficult, and control to send the NACK immediately without attempting decoding the received data. For example, as shown in FIG. 7, when the first alpha value $\alpha_{CQI}$ for the CQI calculation is 0.3 and the second alpha value $\alpha_{DATA}$ for the data decoding is 0.4, the decoding operation determining unit 205 can determine that a probability of the decoding failure is very high because of considerable decoding performance gap due to a difference 701 of the first alpha value $\alpha_{CQI}$ and the second alpha value $\alpha_{DATA}$, omit the decoding operation for the received data, and control to send the NACK indicating the decoding failure to the base station.

Figure 16:
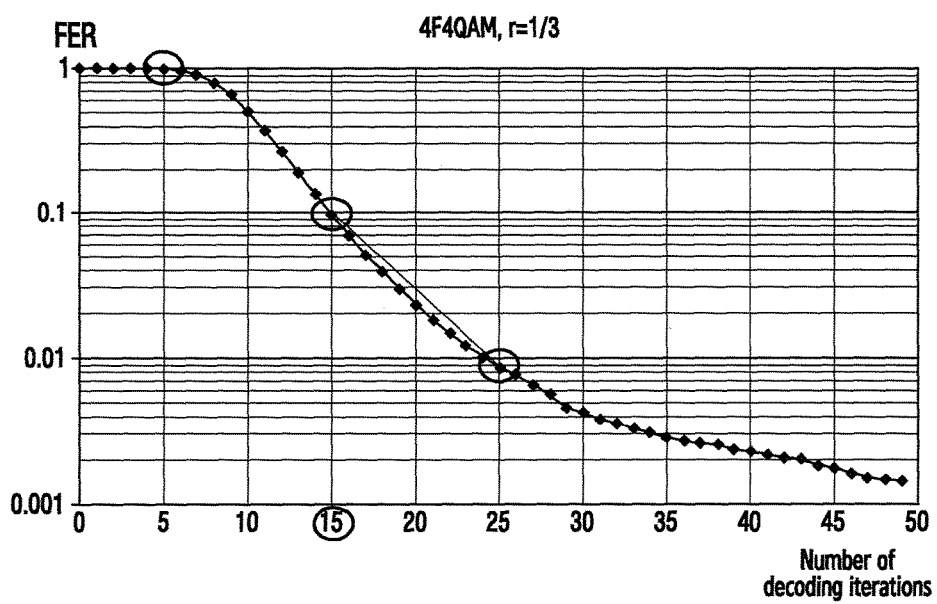
FIG. 16 is a curve graph showing a performance gain based on the number of decoding iterations in a terminal according to an embodiment of the present invention.

For example, as shown in FIG. 16, when the number of the decoding iterations is continually increased, a higher performance gain can be obtained. However, as the number of the decoding iterations rises, system complexity increases and accordingly the number of the decoding iterations in the system is limited. Hence, when the mismatch metric is smaller than $THR_{FAIL}$, even when additional decoding iterations are conducted as many as the maximum number of the decoding iterations, the embodiment of the present invention can determine that the probability of the decoding fail is great and omit the decoding operation for the received data. For example, as shown in FIG. 7, when the alpha value is changed from 0.3 to 0.4, the decoding performance gap is quite considerable. Accordingly, although the additional performance gain of 1 dB is obtained by adding ten decoding iterations which can be executed as much as possible, the decoding operation determining unit 205 can determine that the probability of the decoding fail is great and omit the decoding operation for the received data.

Figure 8:
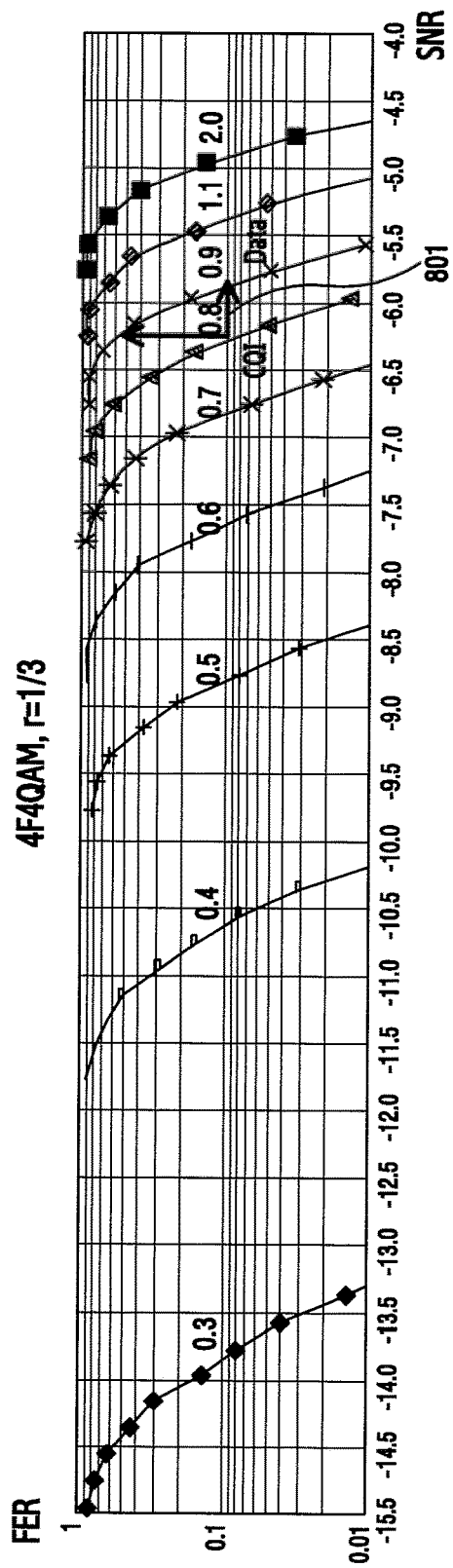
FIG. 8 is a graph for determining a decoding method of a terminal according to an alpha value in the terminal according to another embodiment of the present invention.

When the mismatch metric value is smaller than $THR_{NORMAL}$ and greater than $THR_{FAIL}$ ($THR_{FAIL} < M < THR_{NORMAL}$), the decoding operation determining unit 205 can determine that the non-Gaussian level is quite degraded and it is difficult to successfully decode corresponding data with a pre-calculated decoding parameter, and adjust the decoding parameter though the decoding complexity is increased. For example, as shown in FIG. 8, when the first alpha value $\alpha_{CQI}$ for the CQI calculation is 0.8 and the second alpha value $\alpha_{DATA}$ for the data decoding is 0.9, the decoding operation determining unit 205 can determine that there is a decoding performance gap due to a difference 801 of the first alpha value $\alpha_{CQI}$ and the second alpha value $\alpha_{DATA}$ but its performance gap is not that great, and thus control to decode the data by adjusting the decoding parameter value though the decoding complexity increases. For example, the value adjustment of the decoding parameter can include increasing the number of the decoding iterations, increasing the number of global iterations in a BICM system, increasing the nm value indicating a configuration set size in the sub-optimal non-binary decoding, and so on. Here, the value of the decoding parameter can increase in proportion to the mismatch metric value.

Particularly, the decoding operation determining unit 205 can determine the number of the additional decoding iterations such that the number of the decoding iterations increases by a particular number of times based on the mismatch metric. For example, the number of the decoding iterations can be determined with floor(−10*M), or using a table showing relations of the mismatch metric and the number of the additional decoding iterations. When the mismatch metric value is greater than $THR_{NORMAL}$ and smaller than $THR_{GOOD}$ ($THR_{NORMAL}<M<THR_{GOOD}$ the decoding operation determining unit 205 can determine that change of the non-Gaussian level is slight and determine to decode with the decoding parameter pre-calculated in the CQI calculation.

Figure 9:
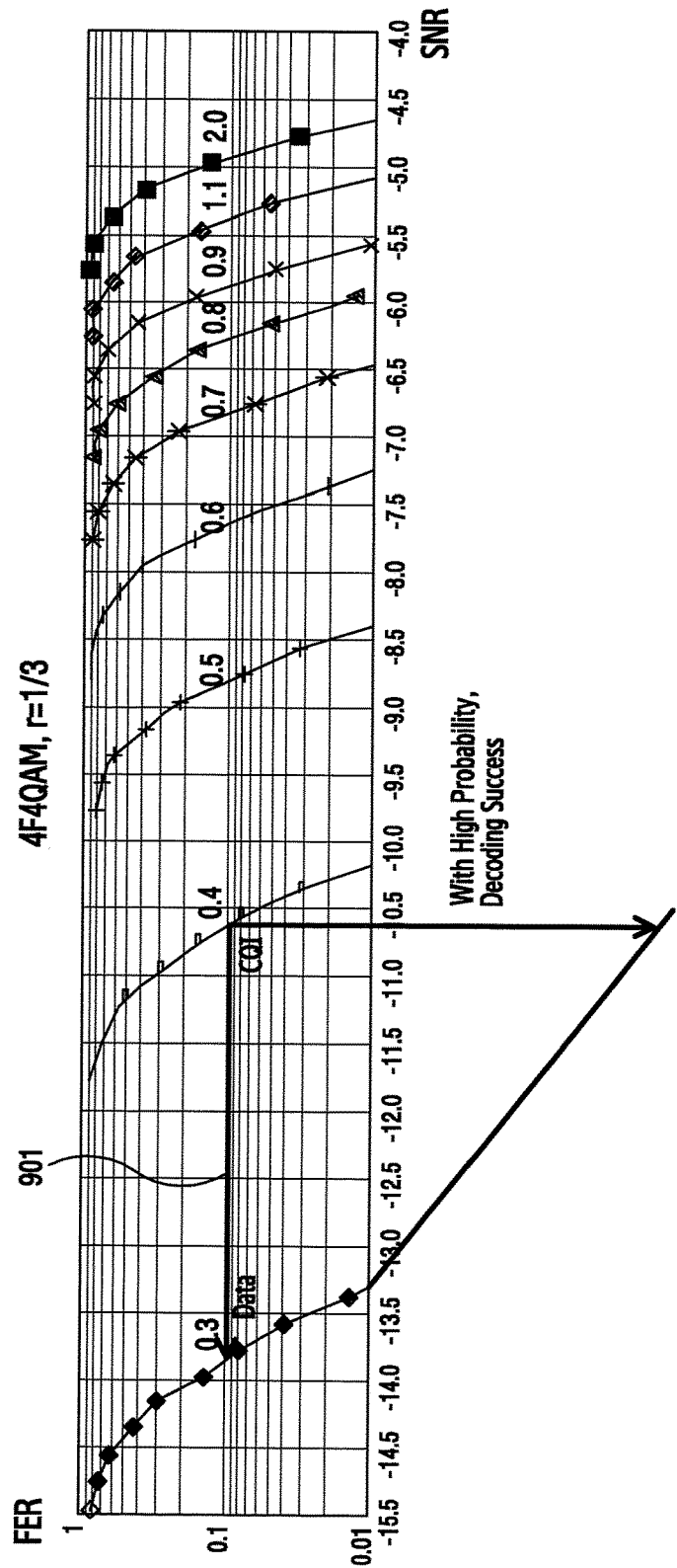
FIG. 9 is a graph for determining a decoding method of a terminal according to an alpha value in the terminal according to yet another embodiment of the present invention.

When the mismatch metric value is greater than $THR_{GOOD}$ ($THR_{GOOD}<M$), the decoding operation determining unit 205 can determine that the non-Gaussian level is improved, determine that corresponding data can be fully decoded with the pre-calculated decoding parameter, and adjust the decoding parameter so as to lower the decoding complexity. For example, as shown in FIG. 9, when the first alpha value $\alpha_{CQI}$ for the CQI calculation is 0.4 and the second alpha value $\alpha_{DATA}$ for the data decoding is 0.3 (901), the decoding operation determining unit 205 can determine a very high probability of the successful decoding with the preset decoding parameter in the CQI calculation, and thus control to decode the data by adjusting the decoding parameter value so as to decrease the decoding complexity. For example, the value adjustment of the decoding parameter can include decreasing the number of the decoding iterations, decreasing the number of global iterations in the BICM system, decreasing the nm value indicating a configuration set size in the sub-optimal non-binary decoding, and so on.

In particular, the decoding operation determining unit 205 can determine the number of the decoding iterations not to decode as many as a particular number of times based on the mismatch metric. According to another embodiment, when the mismatch metric value is greater than THR3 ($THR_{GOOD}<M$), the decoding operation determining unit 205 may control to decode the data with the pre-calculated decoding parameter in the CQI calculation without adjusting the decoding parameter.

According to an embodiment, when the mismatch metric determined by the decoding operation determining unit 205 is smaller than a preset threshold (e.g., $THR_{BAD}$) the control unit 203 can control and process a function for sending a scheduling request message which requests resource allocation control, to the base station 103. According to an embodiment, the scheduling request message requesting the resource allocation control may be transmitted together with a message which reports the decoding result and the mismatch metric, or separately. According to another embodiment, the message reporting the decoding result and the mismatch metric may be transmitted by including a parameter requesting the resource allocation control.

The storage unit 207 stores various data and programs required for the operations of the terminal 200. According to an embodiment of the present invention, the storage unit 207 can store at least one decoding parameter information determined in the CQI calculation. Also, the storage unit 207 can store the first alpha value for the CQI calculation and the second alpha value for the data decoding. Also, the storage unit 207 can store information about at least one threshold used to determine the decoding operation according to the mismatch metric of the alpha values.

Figure 3:
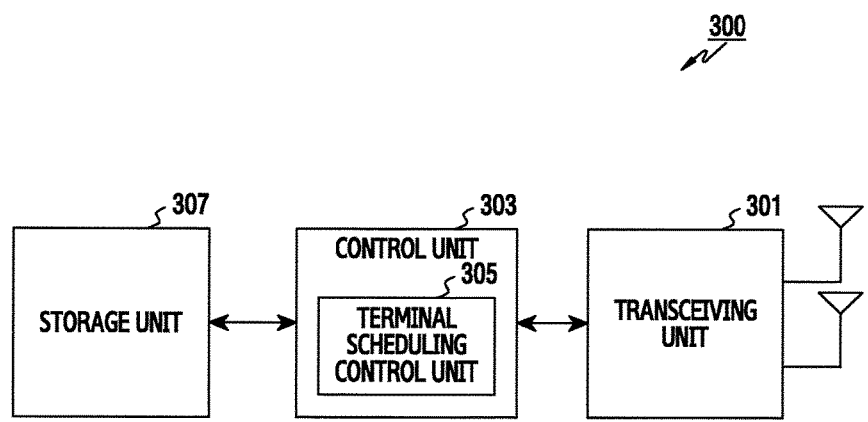
FIG. 3 is a block diagram of a base station according to an embodiment of the present invention.

FIG. 3 is a block diagram of a base station according to an embodiment of the present invention.

Referring to FIG. 3, the base station can include a transceiving unit 301, a control unit 303, and a storage unit 307.

The transceiving unit 301 can transceive signals with the terminal 101 under control of the control unit 303. For example, the transceiving unit 301 can send a pilot signal to the terminal 101. For example, the transceiving unit 301 can transmit MCS information and data to the terminal 101 under the control of the control unit 303. Further, the transceiving unit 301 can receive a CQI and/or a first alpha value from the terminal 101. Also, the transceiving unit 301 can receive a data decoding result and mismatch metric information of alpha values from the terminal 101.

While the transceiving unit 301 is configured as the single module in the embodiment of the present invention, a transmitting unit and a receiving unit may be separately configured according to a design method. Also, although not depicted in the drawing, the transceiving unit 301 can be configured by including a transmitting unit including a plurality of encoders, a plurality of modulators, a plurality of subcarrier mappers, a plurality of modulators, and a plurality of RF transmitters, and by including a receiving unit including a plurality of decoders, a plurality of demodulators, a plurality of subcarrier demappers, a plurality of demodulators, and a plurality of RF receivers. The transceiving unit 301 according to an embodiment of the present invention can include a plurality of modulators and perform the FQAM modulation. The transceiving unit 301 according to an embodiment of the present invention can perform an operation for at least one of chase combining, retransmission, and IR method under the control of the control unit 303.

The control unit 303 controls and processes general operations of the base station 300. The control unit 303 controls and processes functions for sending a pilot signal for channel estimation of the terminal 101, receiving a CQI and/or a first alpha value for CQI calculation from the terminal 200, and determining an MCS based on the received CQI and/or first alpha value. According to an embodiment, the control unit 303 can determine the MCS based on the curve graph showing the MCS based on the alpha value and the SINR as shown in FIG. 14. The control unit 303 can transmit data together with the determined MCS to the terminal. The control unit 303 can receive information about the data decoding result and the mismatch metric value of the alpha values from the terminal, and perform scheduling for the terminal based on the receive data decoding result and the mismatch metric value of the alpha values.

In particular, when the data decoding result received from the terminal 101 is NACK, a terminal scheduling control unit 305 can control an HARQ operation based on the mismatch metric value. For example, to control the HARQ operation based on the mismatch metric value, the terminal scheduling control unit 305 can use at least two thresholds, for example, $THR_{RET}$ and $THR_{CC}$. Here, $THR_{RET}$ and $THR_{CC}$ can satisfy a relation of $THR_{RET}<THR_{CC}$.

For example, when the received mismatch metric value is smaller than $THR_{RET}$, the terminal scheduling control unit 305 can determine to conduct a retransmission method. For example, when the received mismatch metric value is greater than $THR_{RET}$ and smaller than $THR_{CC}$, the terminal scheduling control unit 305 can determine to conduct a chasing combining method. For example, when the received mismatch metric value is greater than $THR_{CC}$, the terminal scheduling control unit 305 can determine to conduct an IR method. Herein, the retransmission method indicates a method for attempting decoding merely with a retransmit packet when a previous packet has an error, and the chase combining method indicates a method for attempting decoding by combining the original packet having error with the retransmit packet. Also, the IR method indicates a method for performing the retransmission by gradually increasing a channel coding gain in every retransmission time.

Figure 10:
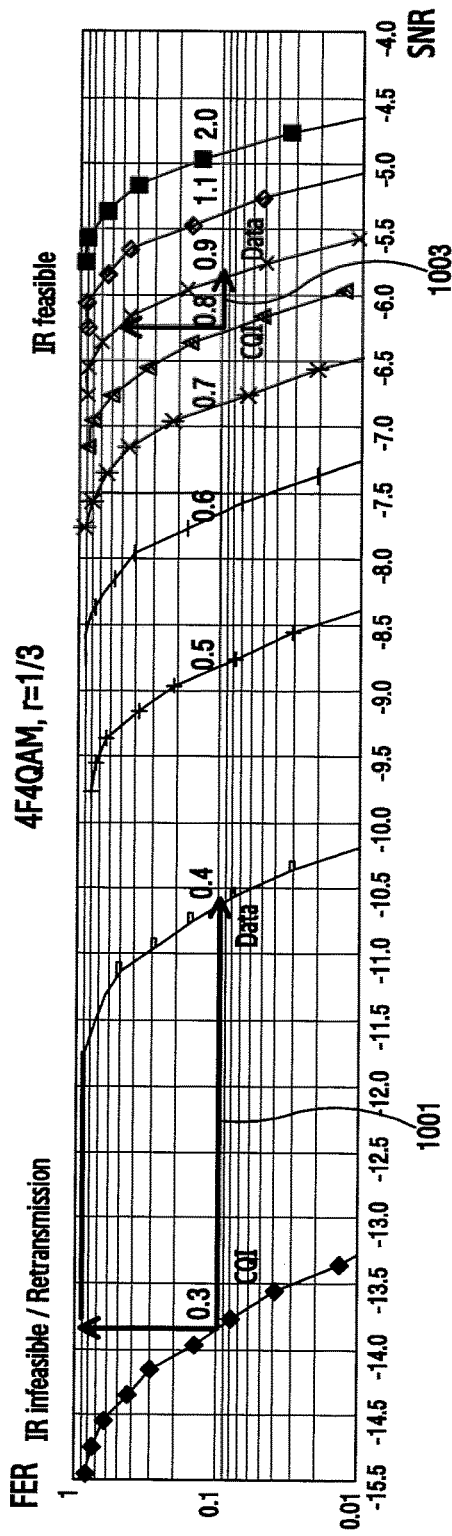
FIG. 10 is a graph for performing Hybrid Automatic Repeat reQuest (HARQ) based on a decoding result in a base station according to an embodiment of the present invention.

For example, as shown in FIG. 10, when the first alpha value $\alpha_{CQI}$ calculated in the terminal 101 for the CQI calculation is 0.3 and the second alpha value $\alpha_{DATA}$ for the data decoding is 0.4 (1001), the terminal scheduling control unit 305 can determine to perform the retransmission method because the IR method is impossible due to great decoding performance gap based on a difference of the first alpha value $\alpha_{CQI}$ and the second alpha value $\alpha_{DATA}$. By contrast, as shown in FIG. 10, when the first alpha value $\alpha_{CQI}$ calculated in the terminal 101 for the CQI calculation is 0.8 and the second alpha value $\alpha_{DATA}$ for the data decoding is 0.9 (1003), the terminal scheduling control unit 305 can determine that the IR method is feasible because of small decoding performance gap based on the difference of the first alpha value $\alpha_{CQI}$ and the second alpha value $\alpha_{DATA}$ and determine to perform the IR method.

Additionally, when the received mismatch metric value is smaller than $THR_{BAD}$, the terminal scheduling control unit 305 can allocate a fixed resource region for the FQAM to the corresponding terminal. $THR_{BAD}$ can satisfy a relation of $THR_{BAD}<THR_{RET}$ or a relation of $THR_{BAD}<THR_{CC}$. As shown in FIG. 11A, the terminal scheduling control unit 305 can separately operate the resource region 1100 fixedly allocated for the FQAM and the resource region 1110 dynamically allocable for the FQAM and the QAM. For example, the terminal scheduling control unit 305 can allocate the fixed resource region 1100 only to terminals supporting the FQAM, and allocate the dynamically allocable resource region 1110 to terminals supporting the FQAM and terminals supporting the QAM.

According to an embodiment of the present invention, the terminal scheduling control unit 305 can change the resources allocated to the terminals based on the mismatch metric value received from a plurality of terminals serviced by the base station. For example, as shown in FIG. 11A, when a terminal 0 of terminals 0, 1, and 2 supporting the FQAM is allocated to the fixed resource region 1100, the terminals 1 and 2 are allocated to the dynamically allocable resource region 1110, a mismatch metric value of the terminals 0 and 2 of the cell 0 is greater than $THR_{BAD}$, and a mismatch metric value of the terminal 1 is smaller than $THR_{BAD}$, the terminal scheduling control unit 305 can allocate the fixed resource region 1110 to the terminal 1 and the dynamically allocable resource region 1110 to the terminal 0 as shown in FIG. 11B.

For example, terminals located on a cell boundary among the terminals serviced from the base station can increase the change of the alpha value due to interference of a downlink channel of a neighboring cell, and thus the mismatch metric value can be smaller than $THR_{BAD}$. In this case, the base station can reduce the change of the alpha value of a corresponding terminal by changing the resource allocation region for the corresponding terminal. Hence, the embodiment of the present invention can induce not to change the alpha value by changing and allocating the resource region to the terminal of which the mismatch metric value is smaller than $THR_{BAD}$.

According to another embodiment, the terminal scheduling control unit 305 can exchange information about the mismatch metric value received from the multiple terminals serviced from the base station, with a neighboring base station, and perform resource allocation scheduling based on the exchanged information. For example, as shown in FIG. 12, when a base station of each cell allocates different resource regions to terminals connected to each base station and the alpha value of the terminal 1 (user 1) connected to the base station of the cell 0 is changed, the base station (e.g., the terminal scheduling control unit 305) of the cell 0 can receive the mismatch metric value indicating the change of the alpha value from the terminal 1 and send the received mismatch metric value to base stations of the cell 1, the cell 2, and the cell 3. Hence, based on the mismatch metric value of the terminal 1 belonging to the base station of the cell 0, the base stations of the cells 1, 2, and 3 can change a purpose of resource regions 1301 through 1304, 1311 through 1315 of the cell 1, the cell 2, and the cell 2 corresponding to resource regions 1300 and 1310 allocated to the terminal 1 of the cell 0 as shown in FIG. 13B.

For example, when the alpha value of the terminal 1 connected to the cell 0 increases from 0.9 to 2.0, the cell 1, the cell 2, and the cell 3 (or a base station 1 of the cell 1, a base station 2 of the cell 2, and a base station 3 of the cell 3) can allocate the resource regions 1301 through 1304 corresponding to the resource region 1300 used by the terminal 1 of the cell 0, to the terminal supporting the QAM, not the FQAM, based on the mismatch metric value indicating the alpha value increase of the terminal 1 connected to the cell 0 from the cell 0, as shown in FIG. 13A. That is, the cell 1, the cell 2, and the cell 3 confirm the increase of the alpha value based on the mismatch metric of the terminal 1 of the cell 0, do not allocate the resource regions 1301 through 1304 corresponding to the resource region 1300 used by the terminal 1 of the cell 0, to the terminal supporting the FQAM, and thus can minimize downlink interference for the terminal 1 of the cell 0.

For example, when the alpha value of the terminal 1 connected to the cell 0 decreases from 0.9 to 0.6, the cell 1, the cell 2, and the cell 3 can allocate the resource regions 1311 through 1315 corresponding to the resource region 1310 used by the terminal 1 of the cell 0, to the terminal supporting the FQAM or the terminal supporting the QAM, based on the mismatch metric value indicating the alpha value decrease of the terminal 1 connected to the cell 1. That is, the cell 1, the cell 2, and the cell 3 can confirm the decrease of the alpha value based on the mismatch metric of the terminal 1 of the cell 0, and allocate the terminal supporting the FQAM or the QAM to the resource regions 1301 through 1304 corresponding to the resource region 1300 used by the terminal 1 of the cell 0.

Additionally, the terminal scheduling control unit 305 can expand the fixed resource region for the FQAM in the whole resource region based on the mismatch metric received from the terminal 101, and allocate the expanded resource region to the terminal supporting the FQAM. According to an embodiment of the present invention, the terminal scheduling control unit 305 can perform a function for expanding the fixed resource region for the FQAM of the base station based on the number of terminals of which the mismatch metric value is below a certain level (e.g., $THR_{BAD}$ or a separate THR), or expanding the fixed resource for the FQAM of the neighboring base station. For example, when the number of the terminals having the mismatch metric value below the certain level is greater than a predefined number of thresholds, the terminal scheduling control unit 305 can request a higher node to expand the size of the fixed resource region for the FQAM. For example, the terminal scheduling control unit 305 can report the number of terminals reporting the mismatch metric below the certain level, to the higher node. In this case, the higher node can determine whether to expand the fixed resource region for the FQAM based on the number of the terminals reported from the base station, and expand the fixed resource region for the FQAM. For example, when the number of the terminals having the mismatch metric value below the certain level is greater than a predefined number of thresholds, the terminal scheduling control unit 305 can request the fixed resource region expansion for the FQAM from a neighboring cell connected with an X2 interface.

According to another embodiment of the present invention, the terminal scheduling control unit 305 can perform a function for expanding the fixed resource region for the FQAM based on the number of terminals sending the scheduling request message for the resource allocation, or expanding the fixed resource for the FQAM of the neighboring base station. For example, when the number of the terminals sending the scheduling request message is greater than a predefined number of thresholds, the terminal scheduling control unit 305 can request the high mode of the base station to expand the size of the fixed resource region for the FQAM. For example, the terminal scheduling control unit 305 can report the number of the terminals sending the scheduling request message for the resource allocation, to the higher node. In this case, the higher node can determine whether to expand the fixed resource region for the FQAM based on the number of the terminals reported from the base station, and expand the fixed resource region for the FQAM. For example, when the number of the terminals sending the scheduling request message for the resource allocation is greater than a predefined number of thresholds, the terminal scheduling control unit 305 can request the fixed resource region expansion for the FQAM from a neighboring cell connected with an X2 interface.

The storage unit 307 stores various data and programs for the operations of the base station 300. Also, the storage unit 307 can store data to send to the terminal 101, and MCS information for the terminal, and can store information about the mismatch metric value received from the terminal 101. Also, the storage unit 307 can store HARQ information and scheduling information relating to each terminal.

Figure 4:
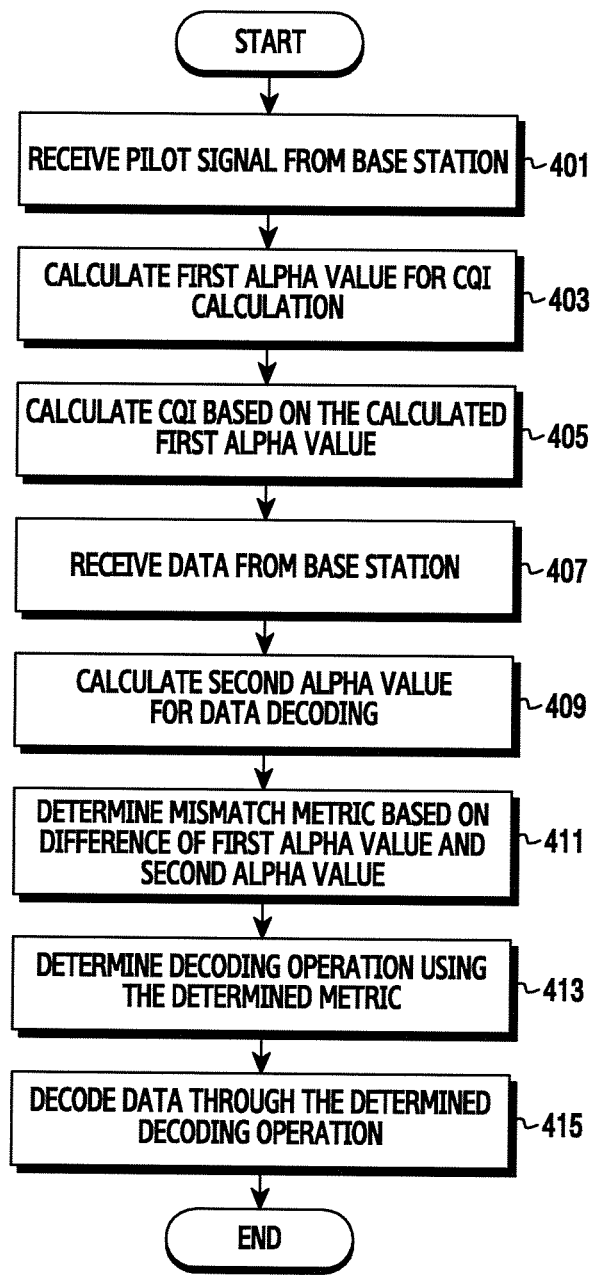
FIG. 4 is a flowchart illustrating a procedure for decoding data based on a mismatch metric of alpha values in a terminal according to an embodiment of the present invention.

FIG. 4 is a flowchart illustrating a procedure for decoding data based on a mismatch metric of alpha values in a terminal according to an embodiment of the present invention.

Referring to FIG. 4, the terminal 101 can receive a pilot signal from a base station in step 401, and calculate a first alpha value for CQI calculation in step 403. For example, using Equations 1 and 2, the terminal 101 can calculate the first alpha value for the CQI calculation based on a pilot signal reception result from the base station.

After calculating the first alpha value, the terminal 101 can calculate the CQI based on the calculated first alpha value in step 405. For example, as shown in FIG. 14, the terminal 101 can determine, as the CQI, a modulation scheme and a coding rate corresponding to an SNR of the pilot signal and the calculated first alpha value using a pre-obtained curve graph. For example, when the SNR is 8.8 dB and the first alpha value is 0.5, the terminal 101 can determine a modulation level as 16FQAM including 4FSK and 4QAM and determine a coding rate as 1/3. Here, the curve graph showing the CQI based on the SNR and the alpha value can be obtained or stored in advance through experiments.

Next, the terminal 101 can receive data from the base station in step 407, and calculate a second alpha value for data decoding in step 409. For example, using Equation 1 and Equation 2, the terminal 101 can calculate the second alpha value for the data decoding based on the MSC and the data reception result from the base station.

Next, the terminal 101 determines a mismatch metric according to a difference of the first alpha value and the second alpha value. For example, the terminal 101 can determine the mismatch metric based on Equation 3. For example, as shown in FIG. 15, the terminal 101 can obtain the mismatch metric according to the difference of the first alpha value and the second alpha value from the table 1501 showing the mismatch metric $M_\alpha$ corresponding to $\alpha_{CQI}$ and $\alpha_{DATA}$. Herein, the values of $\alpha_{CQI}$, $\alpha_{DATA}$, and $M_\alpha$ in the table 1501 of FIG. 15 are exemplary values, and it is evident that they can vary according to A, B, and C values as described in Equation 3. Next, the terminal 101 can determine a decoding operation based on the determined mismatch metric in step 413. For example, the terminal 101 can calculate the mismatch metric for an alpha value change range, and then determine the decoding operation by comparing the calculated mismatch metric with at least one threshold. Next, the terminal 101 can decode the data through the determined decoding operation in step 415.

For example, when the mismatch metric value is smaller than $THR_{FAIL}$, the terminal 101 can determine that it is hard to succeed in the data decoding, and may not attempt to decode the received data. In this case, the terminal 101 can send a NACK to the base station. For example, as shown in FIG. 7, when the first alpha value $\alpha_{CQI}$ for the CQI calculation is 0.3 and the second alpha value $\alpha_{DATA}$ for the data decoding is 0.4, the terminal 101 can determine that the probability of the decoding failure is very high because of considerable decoding performance gap due to the difference 701 of the first alpha value $\alpha_{CQI}$ and the second alpha value $\alpha_{DATA}$, omit the decoding operation for the received data, and send the NACK indicating the decoding failure to the base station.

For example, when the mismatch metric value is smaller than $THR_{NORMAL}$ and greater than $THR_{FAIL}$, the terminal 101 can fulfill the decoding by adjusting the decoding parameter so as to increase the decoding complexity. For example, as shown in FIG. 8, when the first alpha value $\alpha_{CQI}$ for the CQI calculation is 0.8 and the second alpha value $\alpha_{DATA}$ for the data decoding is 0.9, the terminal 101 can determine that there is the decoding performance gap due to the difference 801 of the first alpha value $\alpha_{CQI}$ and the second alpha value $\alpha_{DATA}$ but its performance gap is not that great, and thus control to decode the data by adjusting the decoding parameter value though the decoding complexity increases.

For example, the decoding parameter value adjustment can include increasing the number of the decoding iterations, increasing the number of global iterations in a BICM system, increasing the nm value indicating a configuration set size in the sub-optimal non-binary decoding, and so on. Here, the value of the decoding parameter can increase in proportion to the mismatch metric value. In particular, the terminal 101 can determine the number of the additional decoding iterations based on the mismatch metric such that the number of the decoding iterations increases by a specific number of times.

For example, when the mismatch metric value is greater than $THR_{NORMAL}$ and smaller than $THR_{GOOD}$, the terminal 101 can determine that the change of the non-Gaussian level is slight and decode with the decoding parameter pre-calculated in the CQI calculation.

For example, when the mismatch metric value is greater than $THR_{GOOD}$, the terminal 101 can determine that the non-Gaussian level is improved, determine that corresponding data can be fully decoded with the pre-calculated decoding parameter, and adjust the decoding parameter so as to decrease the decoding complexity. For example, as shown in FIG. 9, when the first alpha value $\alpha_{CQI}$ for the CQI calculation is 0.4 and the second alpha value $\alpha_{DATA}$ for the data decoding is 0.3 (901), the terminal 101 can determine the very high probability of the successful decoding with the preset decoding parameter in the CQI calculation, and decode the data by adjusting the decoding parameter value so as to decrease the decoding complexity.

For example, the decoding parameter value adjustment can include increasing the number of the decoding iterations, increasing the number of the global iterations in the BICM system, increasing the nm value indicating the configuration set size in the sub-optimal non-binary decoding, and so on. In particular, the terminal 101 can determine the number of the decoding decrease based on the mismatch metric not to perform the decoding a specific number of times.

Next, the terminal 101 can finish the procedure according to an embodiment of the present invention.

Figure 5:
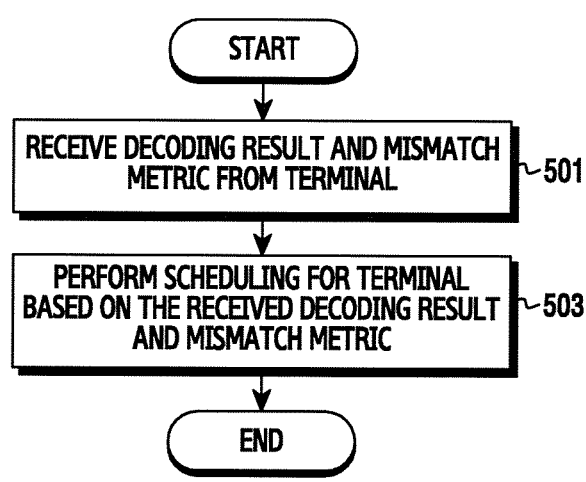
FIG. 5 is a flowchart illustrating a procedure for scheduling based on a mismatch metric of alpha values in a base station according to an embodiment of the present invention.

FIG. 5 illustrates a procedure for scheduling data based on a mismatch metric of alpha values in a base station according to an embodiment of the present invention.

Referring to FIG. 5, the base station 103 can receive a decoding result and a mismatch metric from the terminal 101 in step 501, and perform scheduling for the terminal 101 based on the received decoding result and mismatch metric in step 503. According to various embodiments of the present invention, when the data decoding result received from the terminal 101 is a NACK, the base station 103 can control an HARQ operation based on the mismatch metric value.

For example, the base station 103 can compare the received mismatch metric value with at least one threshold, and thus determine to conduct any one of a chase combining method, a retransmission, and an IR. For example, when the mismatch metric value received from the terminal 101 is smaller than $THR_{RET}$, the base station 103 can determine to conduct the retransmission method. For example, when the mismatch metric value received from the terminal 101 is greater than $THR_{RET}$ and smaller than $THR_{CC}$, the base station 103 can determine to conduct the chasing combining method. For example, when the mismatch metric value received from the terminal 101 is greater than $THR_{CC}$, the base station 103 can determine to conduct the IR method.

According to various embodiments of the present invention, the base station 103 can allocate a different resource to the terminal 101 based on the received mismatch metric value. For example, when a mismatch metric value received from a particular terminal 101 is smaller than $THR_{BAD}$, the base station 103 can allocate a fixed resource region for FQAM of the whole resource region of the base station, to the particular terminal 101. For example, the base station 103 can perform functions for expanding the fixed resource region for the FQAM based on the number of terminals reporting the mismatch metric value smaller than $THR_{BAD}$, and allocating the expanded FQAM fixed resource region to terminals which report the mismatch metric value smaller than $THR_{BAD}$.

For example, the base station 103 can perform a function for expanding the fixed resource region for the FQAM of a neighboring base station based on the number of terminals reporting the mismatch metric value smaller than $THR_{BAD}$. For example, the base station 103 can perform functions for expanding the fixed resource region for the FQAM based on the number of terminals which send a scheduling request message for resource allocation, and allocating the expanded FQAM fixed resource region to the terminals which send the scheduling request message. For example, the base station 103 can perform a function for expanding the fixed resource region for the FQAM of the neighboring base station based on the number of terminals which send the scheduling request message. For example, the base station 103 can perform functions for exchanging with the neighboring base station, information about a mismatch metric reported from a terminal connected to each base station, and allocating a resource region based on the exchanged information.

Next, the base station 103 can finish the procedure according to an embodiment of the present invention.

FIG. 6 is a graph showing a decoding performance difference determined by an alpha value in a terminal according to an embodiment of the present invention.

Referring to FIG. 6, the α value can be divided to 0.3, 0.4, 0.5, 0.6, 0.7, 0.8, 0.9, 1.1, and 2.0. At this time, $\Delta_3$ can denote the SNR difference 601 when α is 0.5 and when α is 0.6.

FIG. 7 is a graph for determining a decoding method of a terminal according to an alpha value in a terminal according to an embodiment of the present invention.

Referring to FIG. 7, when the first alpha value $\alpha_{CQI}$ for the CQI calculation is 0.3 and the second alpha value $\alpha_{DATA}$ for the data decoding is 0.4, the terminal 101 can determine that the probability of the decoding failure is very high because of the considerable decoding performance gap due to the difference 701 of the first alpha value $\alpha_{CQI}$ and the second alpha value $\alpha_{DATA}$. The terminal 101 can abort the decoding operation for the data received from the base station 103, and send the NACK indicating the decoding failure to the base station 103.

FIG. 8 is a graph for determining a decoding method of a terminal according to an alpha value in the terminal according to another embodiment of the present invention.

Referring to FIG. 8, when the first alpha value $\alpha_{CQI}$ for the CQI calculation is 0.8 and the second alpha value $\alpha_{DATA}$ for the data decoding is 0.9, the terminal 101 can determine that there is the decoding performance gap due to the difference 801 of the first alpha value $\alpha_{CQI}$ and the second alpha value $\alpha_{DATA}$ but its performance gap is not that great. The terminal 101 can decode data by adjusting the decoding parameter value though the decoding complexity increases.

FIG. 9 is a graph for determining a decoding method of a terminal according to an alpha value in the terminal according to yet another embodiment of the present invention.

Referring to FIG. 9, when the first alpha value $\alpha_{CQI}$ for the CQI calculation is 0.4 and the second alpha value $\alpha_{DATA}$ for the data decoding is 0.4 (901), the terminal 101 can determine the very high probability of the decoding success with a current decoding parameter in the CQI calculation. The terminal 101 can decode data by reducing the decoding parameter value so as to decrease the decoding success probability and to lower the decoding complexity.

FIG. 10 is a graph for performing HARQ based on a decoding result in a base station according to an embodiment of the present invention.

Referring to FIG. 10, when the first alpha value $\alpha_{CQI}$ calculated in the terminal 101 for the CQI calculation is 0.3 and the second alpha value $\alpha_{DATA}$ for the data decoding is 0.4 (1001), the base station 103 can determine that the IR method is impossible due to the great decoding performance gap based on the difference of the first alpha value $\alpha_{CQI}$ and the second alpha value $\alpha_{DATA}$. Hence, the base station 103 can transmit data by conducting the retransmission method.

By contrast, when the first alpha value $\alpha_{CQI}$ calculated in the terminal 101 for the CQI calculation is 0.8 and the second alpha value $\alpha_{DATA}$ for the data decoding is 0.9 (1003), the base station 103 can determine that the IR method is feasible because of the small decoding performance gap based on the difference of the first alpha value $\alpha_{CQI}$ and the second alpha value $\alpha_{DATA}$. Thus, the base station 103 can transmit data by conducting the IR method.

Although the detailed description of the present invention has described a specific embodiment, the system, the apparatus, and the method described in the present specification may be corrected, added, or omitted as far as they do not depart from the scope of the present invention. For example, elements and devices of the system may combine or separated. Further, operations of the system and the device may be executed by more devices or less devices, or other devices. The method can include more steps, less steps, or other steps. Also, steps can combine and/or be executed in an arbitrary proper sequence.

As above, while the present invention has been described with the limited embodiments and drawings, the present invention is not limited to those embodiments and those skilled in the art to which the present invention belongs can make various modifications and changes based on this disclosure. Operations according to the embodiments of the present invention can be implemented by a single processor. In this situation, program instructions for performing an operation implemented by various computers can be recorded on a computer-readable medium. The computer-readable medium can include a program instruction, a data file, a data structure, and the like, alone or in combination. The program instruction can be specially designed and configured for the present invention or known to and usable by one skilled in the art. Example of a computer-readable recording medium include a hard disk, a magnetic medium such as a floppy disk and a magnetic tape, an optical recording medium such as a Compact Disc (CD)-Read Only Memory (ROM) and a Digital Video Disc (DVD), a magneto-optical medium such as a floptical disk, and a hardware device specially configured for storing and performing a program instruction such as ROM, Random Access Memory (RAM), a flash memory, and the like An example of the program instruction includes not only a machine language code generated by a compiler but also a high-level language code executable by a computer using an interpreter. When whole or part of a base station or a relay described in the present invention is realized as a computer program, the present invention also includes a computer-readable recording medium storing the computer program.

The present invention is described with exemplary embodiments, but various variations and modifications can be suggested to those skilled in the art. The present invention is intended to cover modifications and variations which fall within the appended claims.

The invention claimed is:

1. A method for operating a terminal in a wireless communication system, comprising:
   determining a first characteristic value indicating a non-Gaussian level of an interference signal based on a received signal from a base station;
   determining a second characteristic value indicating a non-Gaussian level of an interference signal based on data received from the base station; and
   decoding the data according to a decoding scheme corresponding to a difference between the first characteristic value and the second characteristic value.

2. The method of claim 1, wherein decoding the data according to the decoding scheme corresponding to the difference between the first characteristic value and the second characteristic value comprises:
   determining a mismatch metric corresponding to the difference between the first characteristic value and the second characteristic value based on at least one of a size of the first characteristic value, a size of the second characteristic value, an increase range of a characteristic value, a quantization level, or a scale parameter; and
   determining the decoding scheme for the data based on the mismatch metric.

3. The method of claim 2, wherein determining the decoding scheme for the data based on the mismatch metric comprises:
   determining the decoding scheme for the data based on a comparison of the mismatch metric with at least one threshold.

4. The method of claim 1, wherein the decoding scheme comprises at least one of a scheme for omitting a decoding procedure for the data and determining a decoding failure for the data, a scheme for adjusting at least one pre-determined decoding parameter, or a scheme for using a pre-determined decoding parameter.

5. The method of claim 1, further comprising:
   transmitting, to the base station, a decoding result of the data and information regarding the difference between the first characteristic value and the second characteristic value.

6. The method of claim 1, further comprising:
   transmitting, to the base station, a message for requesting scheduling for resource allocation based on the difference between the first characteristic value and the second characteristic value.

7. An apparatus of a terminal in a wireless communication system, the apparatus comprising:
   at least one transceiver; and
   at least one processor, operatively coupled to the at least one transceiver, configured to:
      determine a first characteristic value indicating a non-Gaussian level of an interference signal based on a received signal from a base station;
      determine a second characteristic value indicating a non-Gaussian level of an interference signal based on data received from the base station; and
      decode the data according to a decoding scheme corresponding to a difference between the first characteristic value and the second characteristic value.

8. The apparatus of claim 7, wherein the at least one processor is further configured to:
   determine a mismatch metric corresponding to the difference between the first characteristic value and the second characteristic value based on at least one of a size of the first characteristic value, a size of the second characteristic value, an increase range of a characteristic value, a quantization level, or a scale parameter; and determine the decoding scheme for the data based on the mismatch metric.

9. The apparatus of claim 8, wherein the at least one processor is further configured to:

determine the decoding scheme for the data based on comparison of the mismatch metric with at least one threshold.

10. The apparatus of claim 9, wherein the at least one threshold indicates a level of non-Gaussianity of a channel between the terminal and the base station.

11. The apparatus of claim 7, wherein the decoding scheme comprises at least one of a scheme for omitting a decoding procedure for the data and determining a decoding failure for the data, a scheme for adjusting at least one pre-determined decoding parameter, or a scheme for using a pre-determined decoding parameter.

12. The apparatus of claim 7, wherein the at least one transceiver is further configured to:

transmit, to the base station, a decoding result of the data and information regarding the difference between the first characteristic value and the second characteristic value.

13. The apparatus of claim 7, wherein the at least one transceiver is further configured to:

transmit, to the base station, a message for requesting scheduling for resource allocation based on the difference between the first characteristic value and the second characteristic value.

14. An apparatus of a base station in a wireless communication system, the apparatus comprising:

at least one transceiver configured to receive, from a terminal, information regarding a data decoding result and a difference between a first characteristic value and a second characteristic value; and at least one processor configured to perform scheduling for the terminal based on the decoding result and the information regarding the difference between the first characteristic value and the second characteristic value, wherein the first characteristic value indicates a non-Gaussian level of an interference determined based on a signal transmitted to the terminal, and the second characteristic value indicates a non-Gaussian level of an interference determined based on the data.

15. The apparatus of claim 14, wherein the at least one processor is further configured to:

compare the difference between the first characteristic value and the second characteristic value with at least one threshold; and perform at least one of a function related to hybrid automatic repeat request (HARQ) or a change of allocated resources for the terminal according to a result of the comparison.

16. The apparatus of claim 15, wherein the at least one processor is further configured to:

perform at least one scheme of chase combining, retransmission, or incremental redundancy (IR).

17. The apparatus of claim 15, wherein the at least one processor is further configured to:

when the difference between the first characteristic value and the second characteristic value is smaller than a preset threshold, allocate a fixed resource region from among a whole resource region of the base station, to the terminal.

18. The apparatus of claim 15, wherein the at least one processor is further configured to:

adjust a size of a fixedly allocated resource region for a specific modulation scheme based on a number of terminals of which the difference between the first characteristic value and the second characteristic value is smaller than a preset threshold.

19. The apparatus of claim 14, wherein the at least one transceiver is further configured to receive a message for requesting scheduling for resource allocation from the terminal based on the difference between the first characteristic value and the second characteristic value, and wherein the at least one processor is further configured to adjust a size of a fixedly allocated resource region for a specific modulation scheme based on a number of terminals that transmit a message requesting scheduling for the resource allocation.

20. The apparatus of claim 14, wherein the at least one transceiver is further configured to:

transmit information regarding the difference between the first characteristic value and the second characteristic value to at least one neighboring base station, receive information about a difference between a third characteristic value and a fourth characteristic value of a terminal connected to the neighboring base station, from the neighboring base station, and wherein the at least one processor is further configured to change a resource allocation region of the terminal connected to the neighboring base station based on the information about the difference between the third characteristic value and the fourth characteristic value received from the neighboring base station.

* * * * *